UNITED STATES PATENT OFFICE.

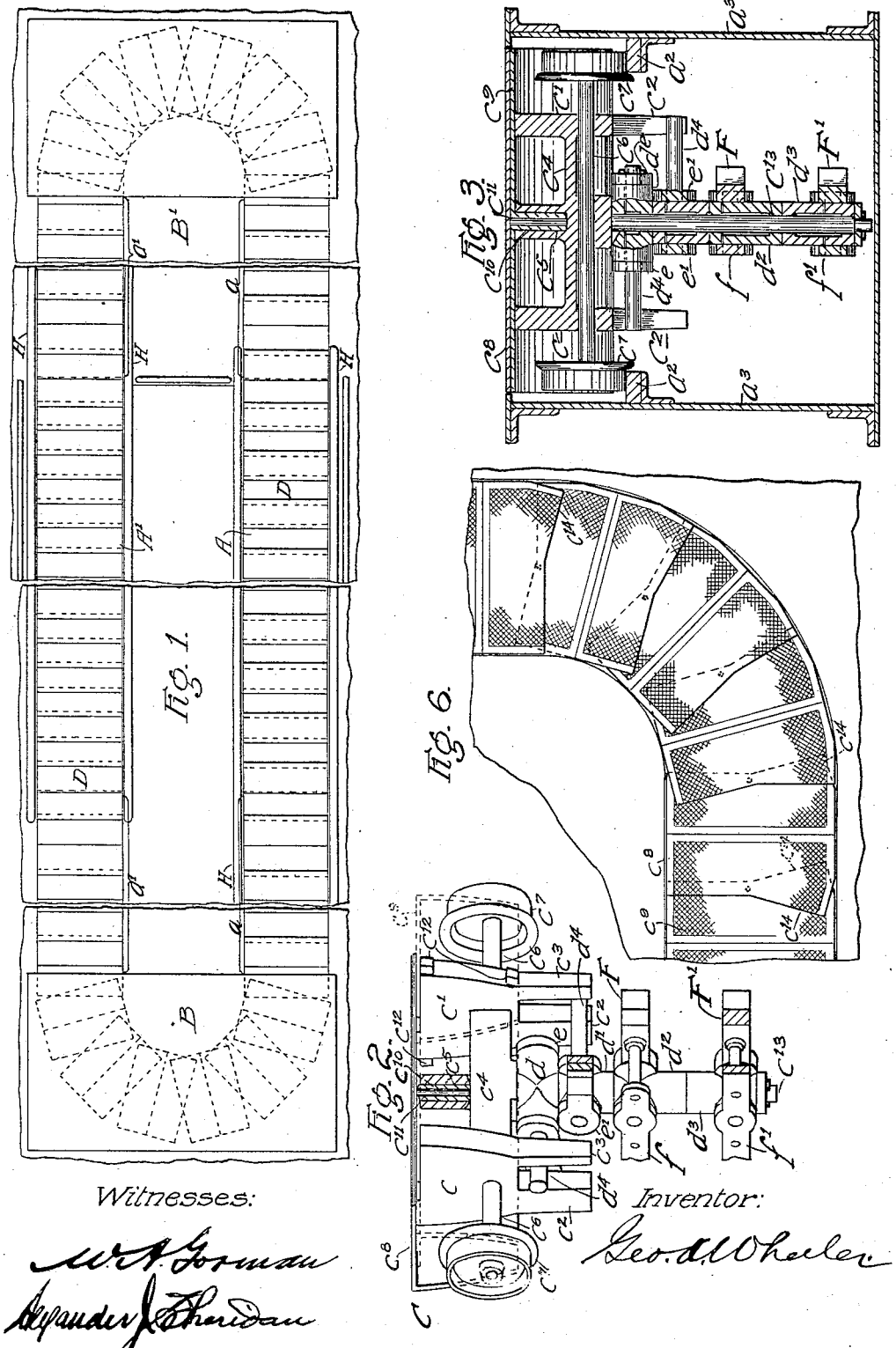

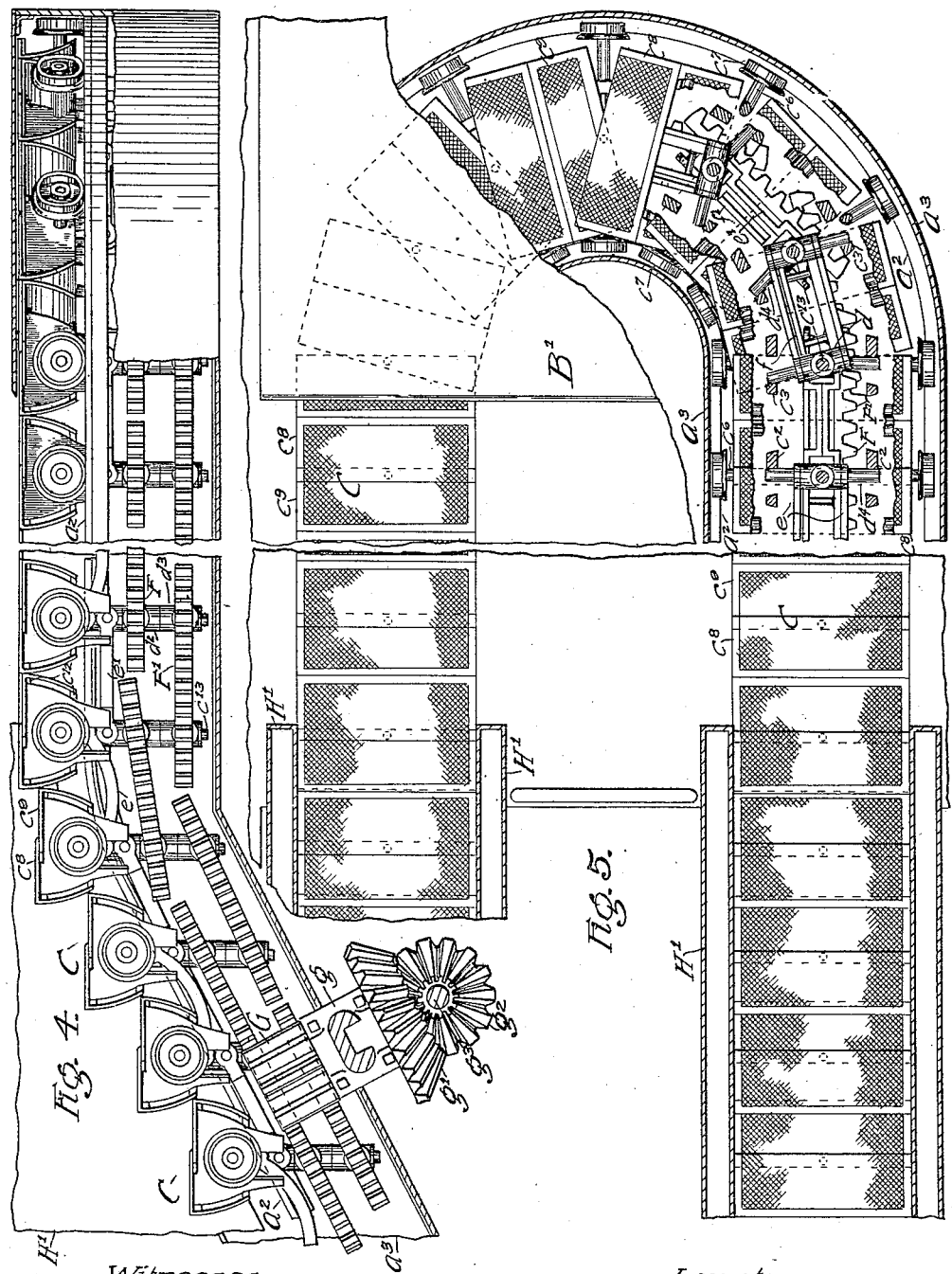

GEORGE A. WHEELER, OF NEW YORK, N. Y.

MOVING STAIRWAY.

1,016,189. Specification of Letters Patent. Patented Jan. 30, 1912.

Application filed June 23, 1908, Serial No. 439,887. Renewed June 27, 1911. Serial No. 635,649.

*To all whom it may concern:*

Be it known that I, GEORGE A. WHEELER, a citizen of the United States, residing in the borough of Brooklyn, Kings county, in the city and State of New York, have invented certain Improvements in Moving Stairways, of which the following is a specification.

The main object of my invention is to so construct a moving stairway, consisting of an endless series of carriages or steps and guides therefor, that the return portion of the stairs may be made a part of the carrying run and utilized to carry passengers.

A further object is to construct a stairway of this type that will occupy a small amount of space, and so construct the belt of steps that it may be propelled with a minimum expenditure of power.

In the accompanying drawings, Figure 1 is a plan view of my improved stairway and is partly diagrammatic. Figs. 2 and 3 are detail isometric and sectional views, respectively, of one of the carriages or steps. Fig. 4 is a detail plan view of a portion of the upper end of my improved stairway with a part of the platform and treads of the steps cut away in order to illustrate devices underneath. Fig. 5 is an end elevation of Fig. 4 with one of the tracks omitted. Fig. 6 is a modification fully described hereinafter.

Referring to Fig. 1, which illustrates a preferred form of my improved stairway, A is the ascending run and $A^1$ is the descending run of the stairway.

B is the lower platform or floor, and $B^1$ the upper platform or floor. The guides for the carriages or steps are so shaped that the steps themselves form part of the two platforms in the present instance, as $a$ and $a^1$ respectively, although this is not essential in carrying out my invention.

D is the endless carrier made up of a series of carriages or steps, preferably of the form clearly illustrated in Figs. 2 and 3 of the drawings. The tread surface of each carriage or step is rectangular in form on the carrying runs and the risers are symmetrical, and the steps are held rigidly in proper position, the edge of one step abutting against the other, so as to close the joints between the steps and make the carrying runs perfectly rigid. When it is desired to turn the steps, it is necessary for the steps to assume a wedge shape in order to pass around the horizontal lateral curved guides or loops by means of which the carrying runs are connected into an endless way and, as it is not usually desirable to use this portion of the carrier, I prefer to turn this portion under a fixed platform or protect it so that it cannot be used; although in some cases, as for instance where the space is limited or it is desired to make a turn in the carrying run or runs of the stairway, I may expose the steps on a curve or curves and construct them in a somewhat modified form, as is clearly illustrated in Fig. 6. In some cases, as for instance at intermediate floor levels, there may be introduced into the carrying runs straight intermediate landings. Thus I do not limit myself to the particular type of stairway shown in the drawings, as the type of stairway will depend largely upon the location.

Referring now to the details of the invention, on each side of the stairway is a rail $a^2$, Fig. 3, which is secured to a suitable string or built up channel member $a^3$. It will be understood that a suitable supporting framework will be provided or an existing structure utilized for such purpose.

Each carriage or step C consists of a frame composed of the webs $c$ and $c^1$, Figs. 2 and 3, provided with the depending fork-like lugs $c^2$ and $c^3$. The webs are connected by a yoke $c^4$, extending upward from the center of which is a post or extension containing a bore or bearing $c^5$. Each step or carriage has a shaft $c^6$ which preferably extends longitudinally through the frame of the step and is provided with wheels $c^7$. In the preferred form, illustrated by Fig. 3, the wheels $c^7$ do not extend beyond the end edges of the treads of the steps which are slightly tilted so that their risers will clear the rails when the steps are on the inclined tracks. Considered with reference to their position on the curved guides, there is preferably but a single wheel, as shown, at the outer as well as the inner ends of the steps, the single wheel on the inner ends permitting of the steps being turned upon a horizontal curve of short radius, as illustrated in Fig. 5.

In order that the steps may be close together on the carrying runs of the stairway and, at the same time, be capable of passing around the curves or loops, their treads must have a rectangular form on the straight portions of the guides and must be free to fold into a wedge shape when they start around the curves. The tread of each step or carriage, therefore, consists preferably of two overlapping members $c^8$ and $c^9$, each provided on opposite sides with pendant risers which may be integral with their respective tread members. These tread members $c^8$ and $c^9$ are pivoted to the step frame so as to swing in horizontal planes, $c^8$ being attached to a sleeve $c^{10}$ journaled in the bore $c^5$ in the yoke $c^4$, and the tread member $c^9$ is attached to a pin $c^{11}$ which in turn is journaled in the sleeve $c^{10}$. The tread members ride on the top edges of the webs $c$ and $c^1$ which are stepped to form a support for both tread members and, at the same time, give clearance for the swing of the tread members.

In order to limit the swing of the tread members $c^8$ and $c^9$, I provide on the edges of the outer web $c$ of the step frame the stops $c^{12}$, Fig. 2, which, by coming in contact with the backs of the risers, limit the outline of the tread to a rectangular form suitable for traveling on the straight portions of the guides; and when, in order to pass around a curve or loop, it becomes necessary for the tread members to take a position oblique to the step frame, they are stopped at the correct angle by the backs of the risers striking against the edges of the inner web $c$ which is shaped accordingly.

Where the tread members are to be exposed while folded, as on a curve, the tread members $c^8$ and $c^9$, instead of being rectangular, are provided with the salient angular extensions $c^{14}$ which serve to prevent any gaps from forming between the tread members when on the curve, as clearly illustrated by Fig. 6. Where the exposure of the tread members when folded occurs at a point or points other than the end loops, as on an intermediate landing, it will be understood that the steps would preferably be flanked on one or both sides by hand-rails referred to hereinafter.

The manner of connecting or enchaining and of controlling the carriages or steps, as well as of driving the resulting endless belt, is similar to that shown and described in a United States Patent which issued to me on the 26th. day of May, 1908, No. 888,950. As noted in that patent, depending below each carriage or step C is a post $c^{13}$ which, in the present instance, projects from the center of the underside of the yoke $c^4$ and may be integral therewith. Swiveled on each post $c^{13}$ are four sleeves $d$, $d^1$, $d^2$ and $d^3$ which are held in place by a washer and cotter pin passing through the bottom of the post $c^{13}$, or by other suitable means. The two upper sleeves each have projecting horizontally an arm $d^4$, and one of these arms extends between the lugs $c^2$ and $c^3$ belonging to one of the webs $c$, while the other extends between similar lugs projecting from the other web $c^1$, as best shown in Figs. 2 and 3. The spaces between the lugs are so proportioned as to permit limited movement of the sleeves $d$ and $d^1$ through predetermined arcs upon the post $c^{13}$ as an axis.

By reference to Fig. 5 it will be seen that the lugs $c^2$ are placed so as to contact with the arms $d^4$ when the steps are traveling on the straight guides and serve to lock the step frames from swiveling on the posts $c^{13}$; and that, when the steps start to pass around the curved guides or loops, the arms $d^4$ contact with the lugs $c^3$ and lock the step frames in radial positions in which positions they are retained while on the loops; and it is obvious that, on leaving the curved guides on the opposite side of the loop, the arms $d^4$ must again contact with the lugs $c^2$ and lock the step frames against lateral movement as before.

The sleeve $d$ has pivoted to it a pair of links $e$ which extend to a similar sleeve belonging to one of the steps next adjacent to it, while a second pair of links $e^1$ is likewise pivoted to the sleeve $d^1$ and extends from this to a similar sleeve on the other adjacent step. The two sleeves $d^2$ and $d^3$ are the same in form and dimensions, and to the sleeve $d^2$ of two adjacent steps is pivotally connected a toothed link or rack F, the connection being made to each sleeve adjacent to one end thereof. In a similar manner a second toothed link or rack $F^1$ is pivotally connected to the sleeve $d^3$. As noted in the patent above referred to, each of the toothed links F and $F^1$ is staggered relatively to the other, being connected to alternate pairs of steps, and the ends of these links are overhung sufficiently to form two practically continuous lines of racks which are parallel and spaced a suitable distance apart vertically to bring their teeth into pitch with each other when the steps, to which the links are attached, are traveling on the inclined guides, where I prefer to place the driving pinions. Both lines of racks are placed upon the outer side of the enchained structure so as to avoid the possibility of interference in going around the curves or loops. The rack links F and $F^1$ both preferably have the companion links $f$ and $f^1$, respectively, pivoted to studs on the opposite sides of their respective sleeves. These links are also preferably overhung somewhat and may be connected with their racks by pins screwed into bored and threaded bosses on the backs of the racks and their opposite ends shouldered and entered into holes in the links $f$ and $f^1$ and riveted. The sleeves $d^2$ and $d^3$, together with their attached links, are relatively interchangeable, the upper ones being merely inverted to form the lower.

It will be observed that the above described method of enchainment permits of the amount of relative movement required to enable the carriages or steps to traverse the endless circuit formed by the guides, while the double lines of parallel links insure their tread surfaces being in the same or in parallel planes at all points throughout their course.

As noted in the patent referred to, in order to drive the stairway I provide a relatively wide faced gear G so mounted that its teeth simultaneously engage the teeth of the toothed links F and $F^1$ of both series. I preferably drive both the ascending and the descending runs of the stairway, providing the gear G, Fig. 4, on the ascending side and a corresponding gear on the descending side. The shaft for the gear G is carried in a suitable bearing $g$ and is provided with a bevel gear $g^1$ meshing with a bevel pinion $g^2$ on a shaft $g^3$ which is mounted in suitable bearings and reaches across under the descending run where it is provided with a bevel pinion similar to $g^2$ meshing with a bevel gear similar to $g^1$ which drives the gear corresponding to the gear G. The second bevel pinion is so mounted, of course, as to drive the gear with which it meshes, and consequently the gear corresponding to the gear G, in an opposite direction to that of the first mentioned gears, $g^1$ and G. This single common driving shaft may be actuated from any suitable source of power. Where there are ascending and descending flights extending through two or more stories, additional single transverse shafts or gears may be provided and driven in synchronism by any suitable means.

It will be seen by reference to Fig. 4 that the wide faced gears like G, by engaging both lines of the parallel racks simultaneously, help to preserve the horizontal alinement of the tread surfaces of the steps; and, in order to further correct this alinement, I may suitably mount on shafts other wide face idler gears at any suitable point or points on the straight guides.

While I have shown platforms spanning the places where the steps pass under the floors, it will be understood that I may, and preferably would, employ other well known means to safeguard passengers at these points. It will also be understood that my improved stairway is preferably provided with the usual moving hand-rails H, the casings for which $H^1$ are indicated in Figs. 4 and 5.

I claim:

1. In a moving stairway or the like, a tread for the steps composed of sections pivoted to swing in horizontal planes, substantially as and for the purpose described.

2. In a moving stairway or the like, comprising a guideway consisting of straight and laterally curved portions, a series of step frames with treads composed of sections pivoted to said frames, substantially as described.

3. In a device of the class described, a step comprising a suitable frame with a tread composed of two members pivoted to said frame on vertical axes located centrally of the step frame.

4. In a device of the class described, a step provided with a tread composed of two lapped members pivoted to fold, the one under the other, substantially as described.

5. In a device of the class described, a step comprising a suitable frame and a tread composed of two lapped members, one of said members being attached to a sleeve journaled in a bore in said step frame, and the other of said members being attached to a pin journaled in the sleeve of said first mentioned member.

6. In a device of the class described, a step comprising a suitable frame with a tread composed of a plurality of members pivoted to said frame, with stops on said frame arranged to limit the swing of the tread members, substantially as described.

7. In a device of the class described, a step comprising a rigid frame with a tread composed of two members pivoted to said frame so as to swing in horizontal planes and adapted to assume either a rectangular or a wedge shape, each of said members having attached to it a riser, with stops on said frame arranged to limit the swing of the tread members to one or the other of the said positions, substantially as described.

8. A moving stairway comprising an endless series of steps with an endless guideway therefor consisting of straight portions and curved portions, the tread surfaces of the steps on the straight portions having a rectangular outline and those on the curved portions being folded into a wedge shape, with means for driving the steps, substantially as described.

9. A moving stairway having ascending and descending runs and curved connecting runs, with steps adapted to travel on said runs and to have a rectangular shape on the ascending and descending runs and a wedge shape on the curved connecting runs, substantially as described.

10. A moving stairway comprising an endless series of carriages or steps and a guideway therefor consisting of substantially straight ascending and descending portions and the necessary substantially horizontal lateral curves to make a complete circuit, the treads of the carriages or steps being adapted to assume a substantially rectangular form on the substantially straight portions of the guideway and to fold into a wedge shape on the curved portions of the guideway, substantially as described.

11. A moving stairway comprising a connected series of steps and guides therefor consisting of straight ascending and descending portions and the necessary horizontal lateral curves to make a complete circuit, the tread surfaces of the steps consisting of a plurality of sections pivoted to the step frames so as to swing in horizontal planes, and adapted to assume a rectangular form on the straight portions of the guides and to fold into wedge shape on the curved portions of the guides, substantially as described.

12. In a device of the class described, an endless guideway consisting of straight portions and of laterally curved portions, carriages or steps adapted to travel on said guideway, each carriage or step having a tread composed of a plurality of members pivoted to swing in horizontal planes and adapted to form rectangular tread surfaces on the straight portions of the guideway and to assume a wedge shape in order to pass around the curves, substantially as described.

13. In a device of the class described, the combination of a pair of rails consisting of straight or substantially straight portions and the necessary lateral curves to make a complete circuit, of a series of carriages or steps, each provided with a pair of supports coöperating with said rails and a tread surface composed of a plurality of members pivoted to swing in substantially horizontal planes and adapted to form substantially rectangular tread surfaces on the straight or substantially straight portions of the rails, and to fold into a wedge shape in order to pass around the curved portions of the rails, substantially as described.

14. In a device of the class described, the combination with a guideway consisting of straight or substantially straight ascending and descending portions and the necessary horizontal lateral curves to make a complete circuit, of a series of steps supported on anti-friction devices, with a single such support on the ends of the steps adjacent to the curves of shorter radius of the guideway, each step being provided with a tread composed of a plurality of members arranged to swing in substantially horizontal planes and adapted to have a rectangular outline on the straight or substantially straight portions of the guideway, and to assume a wedge shape in order to pass around the curved portions of the guideway, substantially as described.

15. In a device of the class described, the combination of a guideway comprising straight or substantially straight ascending and descending portions and the necessary horizontal or substantially horizontal curved portions to make a complete circuit, of a series of carriages or steps, each comprising a rigid step frame and a tread consisting of a plurality of members pivoted to said frame, means connecting the several frames permitting of relative movement in two planes substantially at right angles with each other, devices for locking said frames against lateral movement on both the straight and curved portions of the guideway, and means for driving the carriages or steps.

16. In a device of the class described, the combination with a guideway comprising a pair of rails consisting of ascending and descending portions and the necessary lateral curves to make a complete circuit, of a series of carriages or steps, each provided with a pair of supports coöperating with said rails, a system of parallel links to hold the tread surfaces of the steps or carriages horizontal on all portions of the guideway, each tread being composed of a plurality of members adapted to fold together and to unfold to suit changes in direction of the guideway, substantially as described.

In testimony whereof, I have signed my name to this specification, in the presence of two subscribing witnesses.

GEO. A. WHEELER.

Witnesses:
A. W. HARRIS,
W. A. GORMAN.

---

Copies of this patent may be obtained for five cents each, by addressing the "Commissioner of Patents, Washington, D. C."

It is hereby certified that in Letters Patent No. 1,016,189, granted January 30, 1912, upon the application of George A. Wheeler, of New York, N. Y., for an improvement in "Moving Stairways," an error appears in the printed specification requiring correction as follows: Page 1, line 96, for the word "tilted" read *stilted;* and that the said Letters Patent should be read with this correction therein that the same may conform to the record of the case in the Patent Office.

Signed and sealed this 21st day of May, A. D., 1912.

[SEAL.]                                                      C. C. BILLINGS,

*Acting Commissioner of Patents.*